United States Patent
Handrigan et al.

(10) Patent No.: US 11,544,748 B2
(45) Date of Patent: Jan. 3, 2023

(54) ONLINE ADVERTISING AND PROMOTIONAL COORDINATION SYSTEM

(71) Applicant: ADVOCADO, INC., St. Louis, MO (US)

(72) Inventors: Brian Handrigan, Wildwood, MO (US); Jeffrey Linihan, St. Louis, MO (US)

(73) Assignee: ADVOCADO, INC, St. Louis, MO (US)

(*) Notice: Subject to any disclaimer, the term of this patent is extended or adjusted under 35 U.S.C. 154(b) by 166 days.

(21) Appl. No.: 16/165,519

(22) Filed: Oct. 19, 2018

(65) Prior Publication Data

US 2019/0130461 A1   May 2, 2019

Related U.S. Application Data

(60) Provisional application No. 62/577,507, filed on Oct. 26, 2017.

(51) Int. Cl.
*G06Q 30/02* (2012.01)
*G06F 16/951* (2019.01)

(52) U.S. Cl.
CPC ....... *G06Q 30/0277* (2013.01); *G06F 16/951* (2019.01); *G06Q 30/0275* (2013.01)

(58) Field of Classification Search
CPC .... G06Q 30/00; G06Q 30/0277; G06Q 30/02; G06Q 30/0241; G06Q 30/0251; G06Q 30/0273; G06Q 30/0255; G06Q 30/0256; G06Q 30/0275; G06F 16/951
USPC .................................................. 705/14.71
See application file for complete search history.

(56) References Cited

U.S. PATENT DOCUMENTS

| | | |
|---|---|---|
| 6,229,572 B1 | 5/2001 | Ciardullo et al. |
| 6,661,905 B1 | 12/2003 | Chupp et al. |
| 7,116,374 B2 | 10/2006 | Chupp et al. |
| 7,296,282 B1 | 11/2007 | Koplar et al. |
| 7,587,121 B1 | 9/2009 | Gramelspacher et al. |
| 7,650,624 B2 | 1/2010 | Barsoum et al. |
| 7,664,175 B1 | 2/2010 | Chupp et al. |
| 7,974,438 B2 | 7/2011 | Canel-Katz et al. |

(Continued)

OTHER PUBLICATIONS

Watermark-enabled Value Added Services to Broadcast Audio (Year: 2008).*

(Continued)

*Primary Examiner* — Gautam Ubale
(74) *Attorney, Agent, or Firm* — Norton Rose Fulbright US LLP (57) ABSTRACT

A system and method receive a first signal at one or more processors of a promotional system that indicates automatic detection of presentation of a commercial, determine one or more online advertising settings associated with at least one of a product, service, or entity of interest in the commercial that was detected, and determine a current setting for the one or more online advertising settings from a search engine system. The online advertising settings are associated with a website of interest of the at least one of the product, service, or entity of interest. The system and method also send a second signal to the search engine system that temporarily changes the one or more online advertising settings during a time period following detection of the presentation of the commercial.

17 Claims, 5 Drawing Sheets

(56) References Cited

U.S. PATENT DOCUMENTS

| | | | |
|---|---|---|---|
| 8,571,257 B2 | 10/2013 | Canel-Katz et al. | |
| 8,582,781 B2 | 11/2013 | Moulin et al. | |
| 8,646,683 B2 | 2/2014 | Koplar | |
| 9,609,278 B2 * | 3/2017 | Koplar | H04N 7/002 |
| 2009/0210892 A1 * | 8/2009 | Ramaswamy | H04H 60/375 |
| | | | 725/9 |
| 2010/0114709 A1 * | 5/2010 | Athsani | G06Q 30/02 |
| | | | 705/14.66 |
| 2011/0258049 A1 | 10/2011 | Ramer et al. | |
| 2012/0185349 A1 | 7/2012 | Soroca et al. | |
| 2012/0215602 A1 * | 8/2012 | Ramer | G06Q 30/02 |
| | | | 705/14.13 |
| 2013/0173379 A1 * | 7/2013 | Park | G06Q 30/0246 |
| | | | 705/14.41 |
| 2014/0019534 A1 * | 1/2014 | Handrigan | G06F 16/00 |
| | | | 709/204 |
| 2015/0213511 A1 * | 7/2015 | Kee | G06Q 30/0275 |
| | | | 705/14.71 |
| 2016/0073143 A1 | 3/2016 | Filev et al. | |
| 2017/0318336 A1 * | 11/2017 | Hackett | G06F 16/7844 |
| 2018/0165717 A1 * | 6/2018 | Fidler | G06F 16/951 |
| 2019/0130461 A1 * | 5/2019 | Handrigan | G06F 16/951 |

OTHER PUBLICATIONS

Towards a Multi-Screen Interactive Ad Delivery Platform (Year: 2017).*

An_online_advertisement_platform_based_on_image_content_bidding (Year: 2009).*

Adaptive Keywords Extraction with Contextual Bandits for Advertising on Parked Domains (Year: 2013).*

Search Report and Written Opinion issued in related International Patent Application No. PCT/US2018/056726, dated Jan. 15, 2019.

International Preliminary Report on Patentability corresponding to related International Patent Application No. PCT/US2018/056726 dated May 7, 2020, 5 pages.

Extended European Search Report corresponding to related European Patent Application No. 18871292.1 dated Jul. 9, 2021, 8 pages.

* cited by examiner

ONLINE ADVERTISING AND PROMOTIONAL COORDINATION SYSTEM

CROSS REFERENCE TO RELATED APPLICATIONS

The present application claims the benefit of priority to U.S. Provisional Patent Application No. 62/577,507 filed on Oct. 26, 2017, which is hereby incorporated by reference in its entirety.

BACKGROUND

Internet search engines rely on users submitting search terms for products, services, and the like. The search engines examine keywords and quality metrics associated with the keywords to generate lists of websites that are presented to the users. The order of the websites appearing in the list may be based on the quality metrics associated with the keywords that also are associated with the websites.

The quality metrics may be based on click through rates and bid amounts of the keywords. The click through rates indicate how often users select, or click, the websites associated with the keywords when the websites are returned in the search results. The bid amounts are the monies paid by entities for the keywords. For example, a company may pay 2 USD for a keyword each time the website associated with the keyword is selected by a user in a search.

Users may search for the products or services offered by a company or other entity soon after a commercial or other advertisement of the products, services, or company is broadcast to the user (e.g., airs on television). For example, the amount or rate of Internet searches for a product may spike within a few minutes following the presentation of a television commercial for the product. It may be difficult, however, to predict exactly when the commercials are broadcast. As a result, it currently may be difficult for entities to know exactly when searches for the products or services offered by the entities will increase.

SUMMARY

In one embodiment, a method includes receiving a first signal at one or more processors of a promotional system that indicates automatic detection of presentation of a commercial, determining (using the one or more processors) one or more online advertising settings associated with at least one of a product, service, or entity of interest in the commercial that was detected, and determining (using the one or more processors) a current setting for the one or more online advertising settings from a search engine system. The one or more online advertising settings are associated with a website of interest of the at least one of the product, service, or entity of interest. The method also includes sending a second signal to the search engine system that temporarily changes the one or more online advertising settings during a time period following detection of the presentation of the commercial.

In one embodiment, a system includes one or more processors configured to receive a first signal at one or more processors of a promotional system that indicates automatic detection of presentation of a commercial. The one or more processors also are configured to determine one or more online advertising settings associated with at least one of a product, service, or entity of interest in the commercial that was detected. The one or more processors also are configured to determine a current setting for the one or more online advertising settings from a search engine system. The one or more online advertising settings are associated with a website of interest of the at least one of the product, service, or entity of interest. The one or more processors are configured to send a second signal to the search engine system that temporarily changes the one or more online advertising settings during a time period following detection of the presentation of the commercial.

In one embodiment, a system includes one or more processors configured to receive a first signal that indicates automatic detection of presentation of a commercial. The one or more processors also are configured to determine one or more search engine keywords associated with at least one of a product, service, or entity of interest in the commercial that was detected. The one or more processors are configured to determine a current bid for the one or more search engine keywords from a search engine system. The one or more search engine keywords are associated with a website of interest of the at least one of the product, service, or entity of interest. The search engine system provides search results to Internet searches by user computers based on search terms that are input by the user computers and based on quality metrics of the search terms. The current bid for the one or more search engine keywords represents an amount paid to the search engine system when the user computers select a listed website associated with the one or more search engine keywords from the search results that include the listed website. The one or more processors are configured to send a second signal to the search engine system that temporarily increases the bid for the one or more search engine keywords during a time period following detection of the presentation of the commercial. Increasing the bid for the one or more search engine keywords increases the quality metric of the one or more search engine keywords associated with the website of interest of the at least one product, service, or entity of interest.

In one embodiment, a system includes one or more processors configured to receive a signal indicating automatic detection of a commercial of a product, service, or entity of interest. The one or more processors also are configured to determine a current bid for at least one search engine keyword associated with a website of the product, service, or entity of interest. The one or more processors are configured to increase a location of the website of the product, service, or entity of interest in search results generated by an Internet search engine system by temporarily increasing the bid for the at least one search engine keyword associated with the website of the product, service, or entity of interest.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Research has shown that there is a link between an individual observing some type of broadcast, such a commercial (e.g., via television, cable, or radio), and that same individual (or an individual influenced by that individual) using a second-screen device (such as a smart phone, tablet, computer, etc.) to a access a product or service identified in the commercial or otherwise associated with the commercial. In many cases, such access takes the form of an Internet search, but can also take the form of display (e.g., banner) advertising or video advertising targeted at the individual.

To date, advertisers have been limited in their ability to trace the correlation of online advertising to individuals watching broadcast messages, such as commercials, particularly in an automated and intelligent manner. Options available to the advertisers have included inefficient and ineffective mechanisms that cannot fully correlate online user activity with specific broadcasts. For example, typical mechanisms require an advertiser to monitor the viewing behavior of millions of individuals viewing a broadcast and separately and independently track online activity of the individuals. Subsequent to obtaining the independent streams of online user activity data, the advertiser must process and/or analyze the data to identify any correlations. Such mechanisms are technically limited because they cannot automatically, and in real-time, determine whether an individual, in response to a broadcast, accessed or attempted to access online advertising content (e.g., accessed a website) associated with the broadcast, using for example a mobile device. And the use of such technically limited approaches results in the compiling of independent silos of inaccurate or incomplete data that does not identify specific factors or characteristics (e.g., temporal) of the advertisement that caused the viewers to engage in the online activity or other network activity. Moreover, since the advertiser cannot correlate the online user activity data to a specific broadcast in real-time, the advertiser cannot make real-time adjustments to online advertisements and related content during the time the user is most likely to engage the online advertisements and content. Thus, while broadcast advertising (e.g., a commercial) can reach millions of viewers, using existing technologies, the advertiser is limited in their ability to understand the effectiveness of the broadcast to cause viewers to engage in online activity, and more specifically, determining whether a particular broadcast advertisement actually caused individuals to engage in online activities associated with the broadcast and/or a product associated with the broadcast advertisement.

Accordingly, to address the specific technical limitation of not being able to correlate targeted online advertising and online user activity with specific broadcast advertisements (among other technical problems), the disclosed system uses an inaudible audio watermark or other type of unique identifier, embedded or otherwise encoded in the broadcast signal, to identify the start (and possibly end) of a commercial message (or other program). Based on the audio watermark, the disclosed system can then dynamically make changes to settings of a targeted online advertising campaign (e.g., an advertisement displayed on a webpage, web content, application content and/or the like). The settings may include, but are not limited to, bid amounts for keyword searching, geolocation targeting of advertisements (e.g., where advertisements are shown), preferred online advertisement (e.g., replacing one advertisement for another), placement (e.g., the medium and/or location in which the advertisement is shown), creative (e.g., the content of the advertisement), etc. The system, in real-time and in direct response to correlating a broadcast with user online activity, temporarily and immediately adjusts the appropriate settings to increase or maximize the opportunity of the advertisers to deliver online advertising message to the individual consuming the broadcast, who then accesses (or causes others to access) online content related to the advertiser when the individual is most open to the message of the advertiser.

In a typical usage scenario, a broadcast message (possibly a commercial, or a program or a target component of a program) is transmitted to an individual via over-the-air transmission, satellite transmission, a cable operator, or an over-the-top broadcast provider. The message may be an audio and/or video message or an audio message only. The transmission could also include future broadcast experiences such as augmented reality, virtual reality, 360 immersive experiences, etc. At specific points of the broadcast signal, inaudible watermarks (the tag) are placed in the broadcast message to be observed by one or more sensing devices (e.g., the devices 102 described herein). The inaudible watermarks are described in one or more of the patents incorporated by reference herein, as described below.

The specifics of the data observed, collected, and re-transmitted by the sensing devices 102 may be of a varied nature and may (or may not) be encrypted using one or more ciphers. The data may be a serial number that has no meaning without a reference database, may be descriptive data in and of itself, and/or may be a combination of reference data plus context data (such as but not limited to) market, placement in the broadcast message or any other detail that could be useful.

Once a tag is observed by one or more sensing devices 102, the sensing device(s) 102 may store a history of the observations locally and/or transmit the observations to a centralized promotional system (e.g., the system 100) in batch form or in real-time (or near real-time) as the observations occur. The sensing devices 102 may be placed in specific geographic areas to monitor local broadcast media as well as placed in central locations to monitor national media. Additionally, as smart phones and digital assistant devices become more prevalent (and more effective), the sensing devices may move from these aggregate locations to more effectively identify specific geolocations, businesses or households.

After a tag observation is received by the promotional system 100, if the tag is a tag identified in the promotional system 100 as a tag that affects online advertising setting, online advertising instructions are retrieved from a database (note that the instructions can relate to one or more online advertising channels, such as search engine marketing, programmatic display advertising, programmatic online video advertising, etc.). If the instructions are related to search engine marketing, settings such as keyword bids, geolocation targeting, creative preference, etc., may be adjusted for a specified period of time.

In one embodiment, the actual bid adjustment parameter may be dynamically generated by querying the search engine system 114 (by keyword) for an estimate of the bid required to achieve a top or priority position in the paid search engine results. The promotional system 100 may retrieve the bid amounts needed to achieve the desired position and use that information as the basis for the temporary bid adjustments in the specific locale being targeted for a particular adjustment. After a specified period of time has passed, the promotional system may revert any adjustments back to the settings they had before the adjustment.

In another embodiment, if the instructions are related to programmatic display advertising, settings such as placements, geolocation targeting, content targeting, creative preference, etc., may be adjusted for a specified period of time. After the specified period of time has passed, the promotional system 100 may revert any adjustments back to the settings they had before the adjustment.

In another embodiment, if the instructions are related to programmatic online video advertising, settings such as placements, geolocation targeting, content targeting, creative preference, etc., may be adjusted for a specified period of time. After the specified period of time has passed, the promotional system 100 may revert any adjustments back to the settings they had before the adjustment.

These embodiments of online advertising examples are not intended to be exclusive, but are representative of some of the online advertising mediums that may be managed by the promotional system 100.

The promotional system 100 is not intended to be a single threaded system; rather, the promotional system may manage multiple outlets, markets, broadcast messages for both single and multiple advertisers. This may result in multiple simultaneous adjustments for one advertiser as well as multiple simultaneous adjustments across advertisers.

The promotional system 100 may also store the history of adjustments as well as correlated individual engagements to assess the efficacy of the adjustments.

Thus, the various systems and methods described herein automatically determine when a commercial or other promotion of a product or service is broadcast, for example on a television. Responsive to determining that the promotion has aired or is airing (i.e., has been broadcasted or is being broadcasted), the system automatically increases a bid amount at an Internet search engine system 114 for one or more previously selected keywords associated with the product or service in the promotion. The automatic detection of the airing of the commercial may be performed by an electronic device detecting auxiliary data that is encoded in an audio signal, a video signal, or both the audio signal and video signal of the commercial or other broadcast. Alternatively, the auxiliary data may be communicated or conveyed via another path, such as via metadata associated with the commercial, via data packets received through the Internet (or another network), or the like. For example, a mobile phone, tablet computer, smart television, etc., can automatically detect the presence of the auxiliary data when the commercial airs and use this detection of the auxiliary data to determine that the commercial is airing.

The increase in the bid amounts may be a temporary increase that also increases the quality metrics associated with the keywords. This can result in the website of the entity being placed in a higher or more prominent location in the list of search results conducted by users.

After expiration of a relatively short time limit (e.g., three to thirty minutes), the promotional system can contact the search engine system again to decrease the bid amounts for those previously selected keywords. Doing so can avoid the promotional system over-paying for the keywords after user interest in the product or service has waned following the airing of the commercial.

Optionally, the promotional system 100 can determine the geographic location in which the promotion of the product or service aired and can increase the bid amounts for the previously selected keywords in a limited geographic area that includes the determined geographic location. For example, the bid amounts may be temporarily increased in a list of one or a few ZIP codes, towns, counties, or the like, where the commercial aired, but not in all ZIP codes, towns, counties, etc. This can target the increase in quality metrics for the keywords to those locations or areas where the commercial recently aired.

Figure 1:
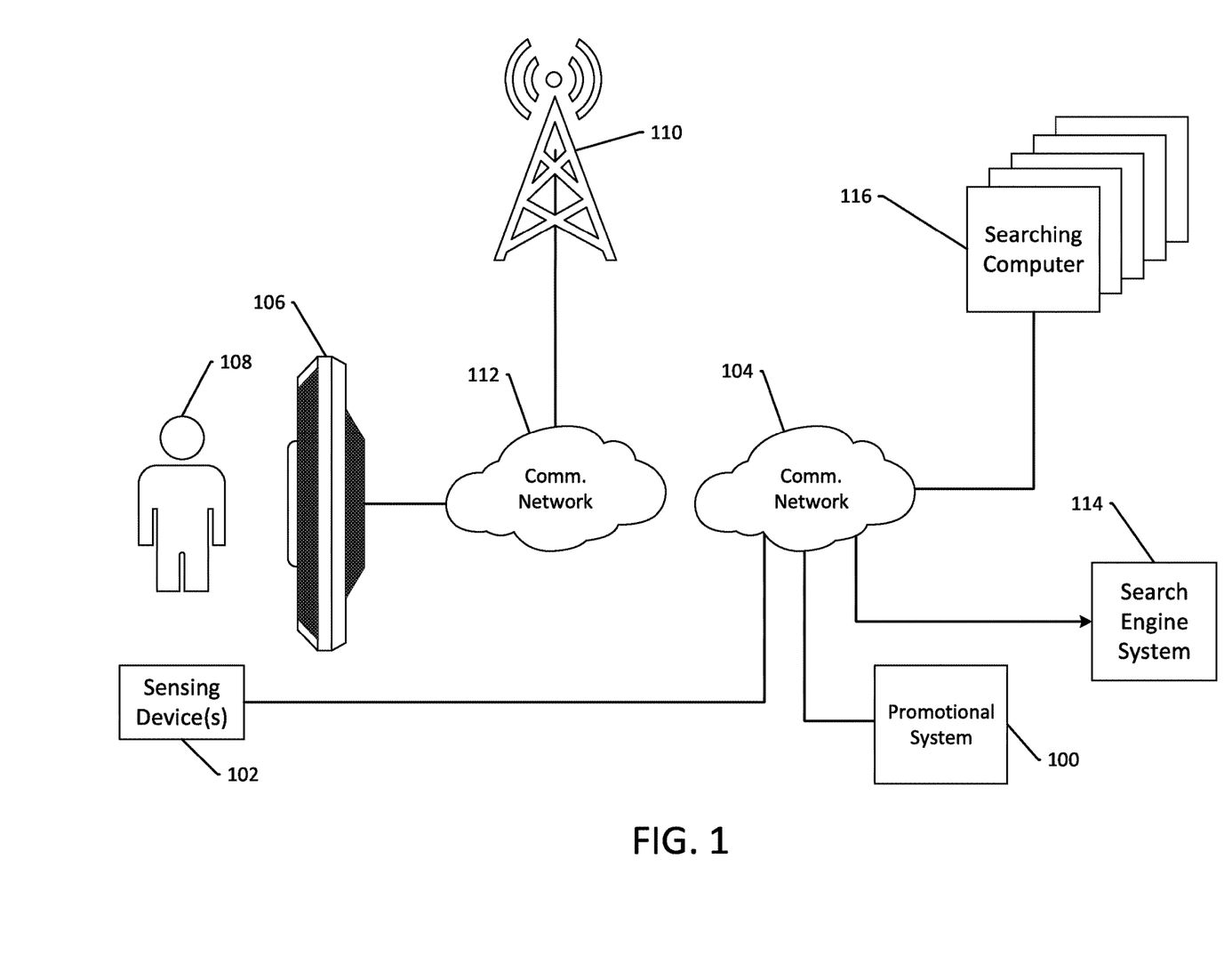
FIG. 1 illustrates one embodiment of computing network including a promotion system specifically implemented to coordinate and/or correlate broadcasts with online advertising, according to aspects of the present disclosure.

FIG. 1 illustrates one embodiment of a computing environment 100 that includes a promotional system 100. The promotional system 100 represents hardware circuitry that includes and/or is connected with one or more computer processors (e.g., one or more microprocessors, integrated circuits, and/or field programmable gate arrays) that perform the operations described herein in connection with the various other components of the computing environment 100.

The promotional system 100 communicates with an electronic sensing device 102 via one or more computer communication networks 104. The communication network(s) 104 may include one or more wireless networks such as, but not limited to, one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (VWVAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, 5G, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless The sensing device 102 includes one or more mobile phones, tablet computers, desktop computers, or other computing devices that automatically detect the presentation of a broadcast or a promotional event, such as a commercial. In one specific example, the sensing device 102 may be a smart home appliance or apparatus, such as the AMAZON ECHO or the GOOGLE HOME devices. The promotional event may be the visual display of a commercial for a product, service, entity, etc., on an electronic presentation device 106, the audible mention or reference to the product, service, entity, etc. (e.g., on the presentation device 106, by a person 108, or the like), the audible presentation of a commercial for the product, service, entity, etc. (e.g., on a radio, podcast, or other non-visual manner of presenting the commercial), or the like. The promotional event may be presented in a video commercial, an audible commercial (e.g., radio commercial), or the like.

The electronic presentation device 106 can include: one or more televisions; movie theater screens; scoreboards, jumbotrons, or other displays in a place configured for large gatherings or persons (e.g., sports or concert stadiums); radios; speakers; computers; or the like. In one embodiment, the sensing device 102 and the presentation device 106 may be the same device. For example, the presentation device 106 may be a mobile phone, tablet computer, television, or the like, that both presents a commercial and detects presentation of the commercial.

The sensing device 102 can detect a promotional event that includes an audible mention or reference to the product, service, or entity that does not occur or is not presented through the presentation device 106. For example, the sensing device 102 can automatically detect when the person 108 audibly states or refers to the product, service, or entity.

In one embodiment, the sensing device 102 detects the presentation of the promotional event by automatically detecting the presence of auxiliary data in connection with the presentation of the promotional event. This auxiliary data also may be referred to as a trigger or trigger data. The auxiliary data may be embedded within the presentation of the promotional event. For example, the auxiliary data may be encoded, embedded, or otherwise included in a video signal and/or audio signal communicated to the presentation device 106 by a signal source system 110, such as a television or radio broadcast center, one or more computers, etc. The signal source system 110 can send the signal(s) to the presentation device 106 via one or more networks 112 of wired and/or wireless connections with the presentation device 106. In one embodiment, the network(s) 112 may be included in or be the same as the network(s) 104 used by the promotional system 100 and the sensing device 102 for communication. Alternatively, the networks 104, 112 may be completely separate networks that do not share any of the same networking devices (e.g., cables, wireless connections, routers, modems, antennas, etc.).

The sensing device 102 can include: a microphone and/or camera (or other optical sensor) that detects the auxiliary data embedded in the presentation of the promotional event. Alternatively, the auxiliary data may not be included in the video and/or audio signal(s) sent from the signal source system 110, but may be communicated from the signal source system 110 to the sensing device 102 and/or the presentation device 106 with the video and/or audio signals. For example, the auxiliary data may be included in one or more separate data packets than the data representative of the video and/or audio signal(s) sent from the signal source system 110 to the presentation device 106. The separate auxiliary data may be communicated at the same time as (e.g., concurrently and/or simultaneously with) the video and/or audio signals sent from the signal source system 110, or may be communicated at an earlier time to notify the sensing device 102 when the promotional event will be presented.

In one embodiment, the sensing device 102 can visually, optically, or audibly detect the auxiliary data as described one or more of U.S. Pat. No. 7,650,624, titled "Method And Apparatus For Modulating A Video Signal With Data"; U.S. Pat. No. 8,646,683, titled "Method And System For Device Notification"; U.S. Pat. No. 6,229,572, titled "Method For Transmitting Data On Viewable Portion Of A Video Signal"; U.S. Pat. No. 6,661,905, titled "Method For Transmitting Data On A Viewable Portion Of A Video Signal"; U.S. Pat. No. 7,296,282, titled "Interactive Optical Cards And Other Hand-Held Devices With Increased Connectivity"; U.S. Pat. No. 7,116,374, titled "Method And System For Enhanced Modulation Of Video Signals"; U.S. Pat. No. 7,664,175, titled "Mark-based Content Modulation And Detection"; U.S. Pat. No. 7,974,438, titled "Spatial Data Encoding And Decoding"; U.S. Pat. No. 7,587,121, titled "Method And System For Multiple Field Modulation"; U.S. Pat. No. 8,582,781, titled "Echo Modulation Methods And Systems"; U.S. Pat. No. 9,609,278, titled "Method And System For Auxiliary Data Detection And Delivery"; and/or U.S. Pat. No. 8,571,257, titled "Method And System For Image Registration". The entire disclosures of these patents are incorporated herein.

Responsive to detecting the auxiliary data, the sensing device 102 may automatically communicate a trigger or event signal to the promotional system 100 via the network(s) 104. The signal notifies the promotional system 100 that the promotional event is being presented or was recently presented (e.g., within a time period that is no greater than the time needed for processing of detection of the auxiliary data, communication of the signal via the network(s) 104, and processing of the signal by the promotional system 100). The promotional system 100 can then determine that the promotional event is being presented and can identify certain characteristics of the presentation of the promotional event.

The trigger or event signal sent from the sensing device 102 to the promotional system 100 may identify the promotional event and/or the product, service, and/or entity associated with the promotional event. Optionally, the signal can include data indicative of a geographic location of where the presentation of the promotional event was detected by the sensing device 102. The geographic location may be a longitude/latitude component, a ZIP code, a town, county, state, etc. Upon receipt of the trigger or event signal, the promotional system 100 determines one or more keywords of interest associated with the promotional event having the presentation that was detected. The promotional system 100 can compare the product, service, or entity identified by the trigger or event signal with a list, table, or other memory structure in a database of the promotional system 100 that associates different sets of keywords of interest with different products, services, and/or entities. The promotional system 100 can identify one or more selected sets of keywords based on this comparison (e.g., by determining the keywords that are associated with the identified product, service, and/or entity).

The promotional system 100 can then adjust one or more settings related to online advertising responsive to receiving the trigger or event signal. For example, the promotional system 100 can query a search engine system 114 to determine current bids for the keywords of interest within the selected set of keywords. The search engine system 114 represents one or more computers that receive search terms from user computers 116 ("Searching Computer" in FIG. 1) that are input by users at the computers 116 to find websites related to the search terms. One example of an entity that provides the functionality implemented via the search engine system 114 includes ALPHABET, INC., which provides the search engine google.com. Other entities may provide other Internet-based search engines.

The search engine system 114 is connected with the searching computers 116 by the network(s) 104. Optionally, the search engine system 114 may be connected with the searching computers 116 by one or more other, separate networks. The search engine system 114 maintains a list, table, or other memory structure in a database or other tangible and non-transitory computer readable medium (e.g., computer hard drives, optical discs, etc.) that store various keywords and associated bid amounts. These search terms also are associated with different websites. For example, a website for an automobile dealership that advertises the sale of automobiles on the website may be associated by the search engine system 114 with terms such as car, drive, auto, truck, etc.

The search engine system 114 can determine quality metrics for different keywords associated with different websites.

Generally speaking, quality metrics are analytical metrics that are determined by and constantly changed by the search engine system 114. For example, quality metrics may include metrics such as "Quality Score" which is a determination of how relevant the keyword, ad and landing page content combination is for the person (also known as an audience member) conducting the search. In addition to quality metrics, search engines and other online advertising platforms may use intelligent and/or automated audience targeting to find the best match between message and person and over time, the more relevant the digital experience as a result of the current disclosure, the search platform (and/or ad platform) may be able to use this data to train itself on how to identify more relevant audience members. Other quality metrics represent relevant performance indicators. For example, a quality metric "click through rates"—the number of people presented an ad that click it—may be obtained to demonstrate how relevant the presented ad is/was to the users who viewed or otherwise accessed the ad.

The quality metric for a keyword may be based on a click through rate, or rate or percentage at which a user selects or clicks the website in a list or presentation of several websites variously related to the keyword. For example, the click through rate will be greater for the keywords associated with a first website when that first website is selected or clicked more often by users at the searching computers 116 than one or more other websites when the first and other websites are presented in search results based on the keywords.

The quality metric also may be based on the bid amount for the keyword. The bid amount is a financial amount of money paid to the entity maintaining the search engine system 114 and/or providing the functionality of the search engine by entities associated with the various websites. For example, the website for the automobile dealership may pay 2 USD for each user click or selection of the website when the keyword associated with this bid amount is input as a search term by one or more users to find the website. In one embodiment, the quality metric for a keyword is a function of or equivalent to the product of the click through rate and the bid amount for that keyword.

Responsive to the promotional system 100 identifying the set of one or more keywords associated with the product, service, and/or entity featured in the promotional event identified by the sensing device 102, the promotional system 100 communicates a query signal to the search engine system 114 via the network(s) 104. This query signal requests identification of the current bid amounts for the keywords in the set identified by the promotional system 100. The bid amounts may be set or adjusted by the entity providing the functionality of the search engine system 114 and/or by the entities having websites associated with the keywords.

The search engine system 114 responds to receipt of this query signal by determining the current bid amounts for the keywords in the identified set, and communicates a current bid signal to the promotional system 100 via the network(s) 104. The current bid signal informs the promotional system 100 of the current bid amounts for the keywords in the identified set.

The promotional system 100 examines the current bids for the keywords in the set as received from the search engine system 114, and determines an increase in the bids. The promotional system 100 sends an increase signal to the search engine system 114 via the network(s) 104 that informs the search engine system 114 of an increase in the current bids for the keywords in the set and/or of the increased bid amounts for the keywords in the set. The search engine system 114 then increases the bids for these keywords based on and responsive to receiving the increase signal. The bids and corresponding quality metrics for the keywords in the identified set are thereby increased for the keywords associated with the entity, product, and/or service featured in the currently or recently presented commercial.

This can result in Internet searches for the entity, product, and/or service, which can increase in frequency following or during presentation of the commercial, to more prominently feature the website of the product, service, and/or entity. For example, prior to identifying presentation of the commercial and increasing the bid amounts for the keywords, an Internet search for the product, service, or entity using a keyword or keyword phrase may result in the website for the product, service, or entity being featured in the tenth or lower position in the list of search results produced by the search engine system 114.

After identifying the presentation of the commercial and increasing the bid amounts for the keywords, the same Internet search for the product, service, or entity using the same keyword or keyword phrase may result in the website for the product, service, or entity being featured above this position, such as in the top three positions in the list of search results produced by the search engine system 114. This more prominent feature of the website can increase the number of user selections of the website from the search results, thereby directing more web traffic to the website and increasing the click through rate of the keywords. As described above, the quality metric of the keywords may be increased by a greater click through rate.

Optionally, the promotional system 100 can direct the search engine system 114 to increase the bid amounts for the keywords only in one or more designated geographic areas. The designated geographic area can include the geographic location where the airing of the commercial was detected by the sensing device 102. For example, if the sensing device 102 was located in a first ZIP code when the airing of the commercial was detected, then the promotional system 100 can request that the bid amounts for the keywords be increased for searches by searching computers 116 located (e.g., having Internet Protocol addresses) in the first ZIP code, in the first ZIP code and the geographically closest next five ZIP codes, in the same state as the first ZIP code, or the like (but not for other locations outside of this area).

Optionally, the promotional system 100 can adjust one or more other settings related to the online advertising of a product or service featured in the commercial. For example, the promotional system 100 can change the placements of advertisements, can change the locations where the advertisements are shown online, can change the content of the advertisements, or the like.

The promotional system 100 can monitor passage of time using one or more internal clocks to determine when a time limit has been reached after the bid amounts were increased. For example, the promotional system 100 can determine when five minutes, fifteen minutes, thirty minutes, or the like, has passed after increasing the bid amounts. The promotional system 100 can then send a decrease signal to the search engine system 114 via the network(s) 104. This decrease signal can reduce the bid amounts for the same keywords. For example, the bid amounts may be reduced to the amounts in place before the increase. This can prevent the bid amounts remaining elevated after consumer interest in the product, service, or entity has decreased long after the commercial presentation. Optionally, the promotional system 100 can return one or more other settings to previous values, such as by restoring the placements of advertisements, the locations where the advertisements are shown online, the content of the advertisements, or the like, back to the placements, locations, or content that was previously used.

Operation of the promotional system 100 enables the automatic detection of when a commercial is shown so that keywords used to discover websites related to the commercial have increased quality metrics during Internet searches conducted shortly after presentation of the commercial. This can significantly drive Internet traffic toward the websites related to the product, service, or entity featured in the commercial. The bids are automatically decreased a short time later and/or are only increased for searches performed in a limited geographic area to prevent the financial spend for increasing the quality metrics of the keywords being contained or limited.

Figure 2:
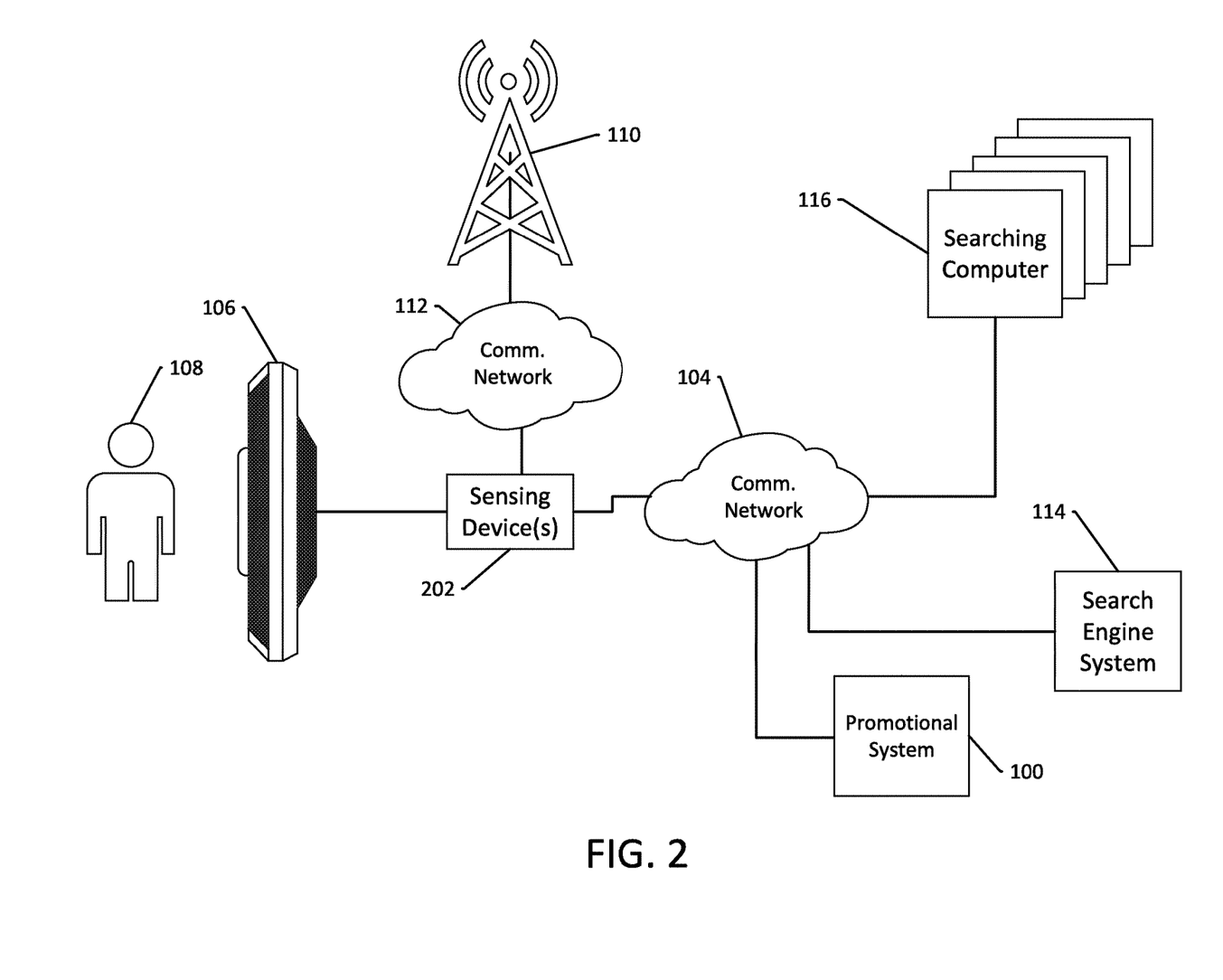
FIG. 2 illustrates an embodiment of operation of the promotion system shown in FIG. 1, according to aspects of the present disclosure.

FIG. 2 illustrates another embodiment of operation of the promotional system 100 shown in FIG. 1. One difference between operation of the promotional system 100 in FIGS. 1 and 2 is that the video and/or audio signal(s) sent to the presentation device 106 may also be provided to a sensing device 202. The sensing device 202 can represent hardware circuitry that includes and/or is connected with one or more processors (e.g., one or more microprocessors, field programmable gate arrays, and/or integrated circuits) that receive the audio and/or video signal(s) and examine the signal(s) to determine if the auxiliary data is present. For example, the sensing device 202 may be a set top box, cable box, satellite television signal decoder, a digital video recorder, or the like. The sensing device 202 can examine the signal(s) sent from the signal source system 110 and determine if the auxiliary data referred to above is present.

If the auxiliary data is present, then the sensing device 202 sends the signal to the promotional system 100 to inform the promotional system 100 of the promotional event (and, optionally, to notify the promotional system 100 of the location of the presentation of the promotional event). The promotional system 100 then operates to identify the set of keywords associated with the promotional event, determine the current bids for the keywords, and to temporarily increase the bids, as described above.

Figure 3:
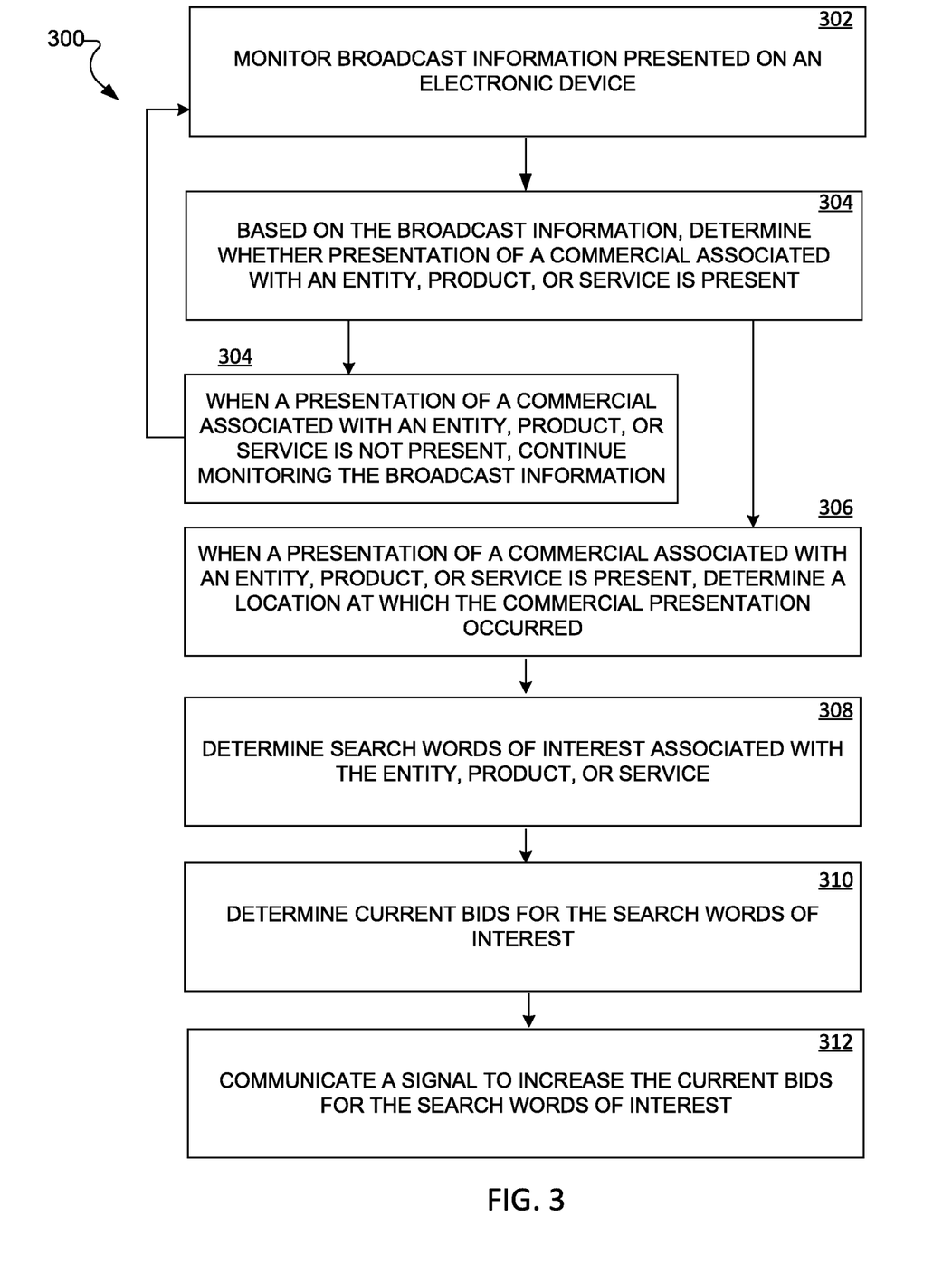
FIG. 3 illustrates a flowchart a method for method for coordinating presentation of a promotional event with Internet searches, according to aspects of the present disclosure.

FIG. 3 illustrates a flowchart of one embodiment of a method 300 for coordinating presentation of a promotional event with Internet searches. The method 300 describes operations performed in connection with the promotional system 100 described herein. The method 300 can represent the operations performed by the promotional system 100 and optionally the sensing device 102 described above. In one embodiment, the method 300 can represent an algorithm implemented as one or more software applications that direct operations of the promotional system 100 and/or sensing device 102.

As illustrated, method 300 begins at 302, where information presented on an electronic device is monitored. For example, the sensing device 102 can monitor presentation of television shows, movies, sporting events, computer programs, or the like, on the presentation device 106. At 304, a determination is made as to whether presentation of a commercial associated with an entity of interest is detected. For example, the sensing device 102 can determine if auxiliary data indicative of presentation of a commercial for a product and/or service offered by an entity is shown on the presentation device 106. When auxiliary data is detected, the method 300 proceeds at 306. Otherwise, the method 300 can return to 302 for continuous monitoring of the information presented on the electronic device for detection of a presentation of a commercial of a promotional event.

At 306, a location at which the commercial presentation occurred optionally is determined. For example, a global positioning system receiver, wireless triangulation device, or the like, in the sensing device 102 may be used to determine the location of the sensing device 102 where the commercial presentation was detected.

At 308, search word(s) of interest associated with the entity of interest are determined. The promotional system 100 can receive a signal indicating detection of the commercial from the sensing device 102 and can identify the entity associated with the commercial from this signal. The promotional system 100 may store different sets of keywords (also referred to as search words) with different entities. The promotional system 100 can determine which search words are associated with the entity of the commercial from these sets of search words.

At 310, the current bids for the search words of interest are determined. The promotional system 100 can obtain the current bids for these words from the search engine system 114, as described above. At 312, a signal is communicated to increase the bids for the search words of interest associated with the entity of interest. This signal may be communicated from the promotional system 100 to the search engine system 114 to increase the bids for the search words of interest associated with the entity featured or referenced in the commercial. The promotional system 100 can then reduce the bids after expiration of a designated period of time, as described above.

Figure 4:
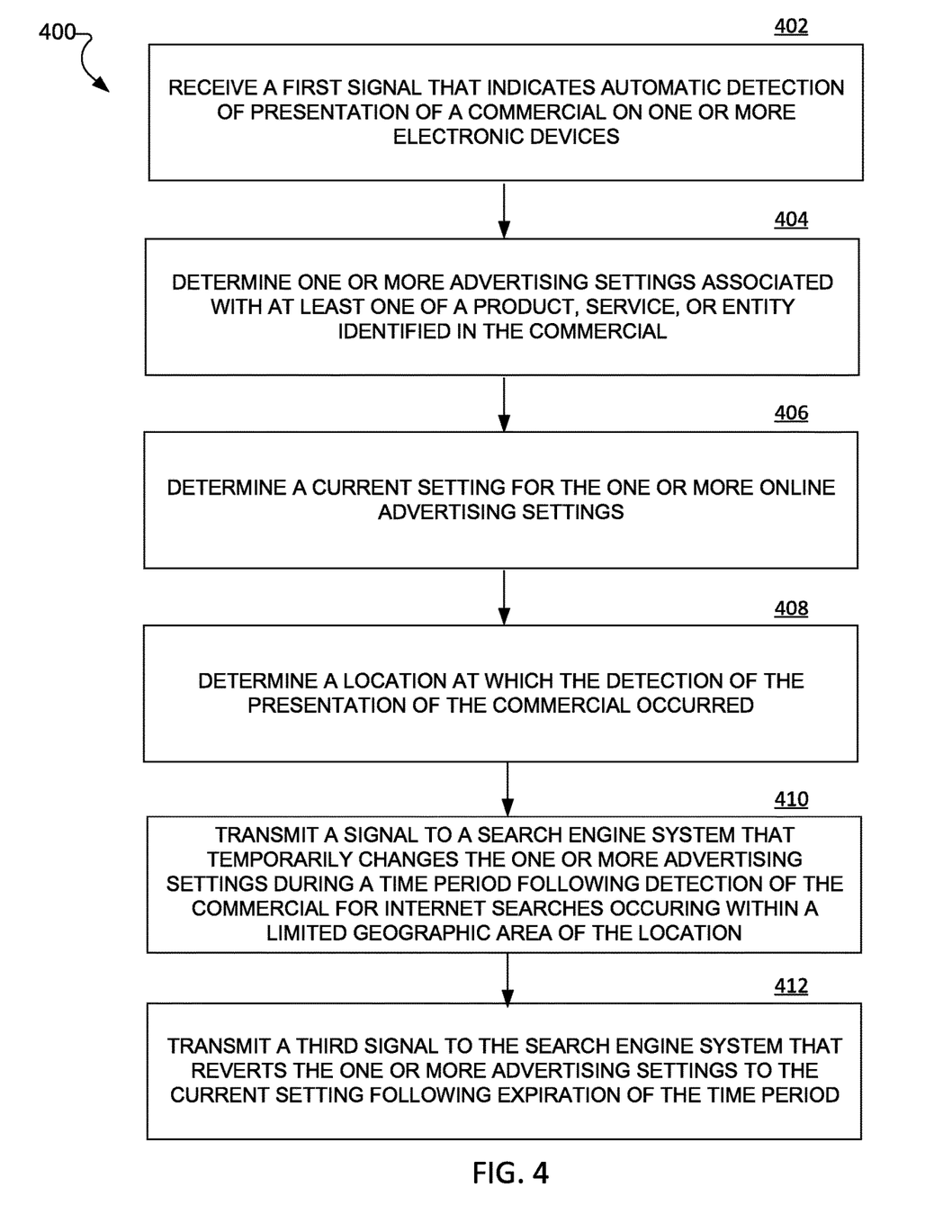
FIG. 4 illustrates another flowchart of another method for method for coordinating presentation of a promotional event with Internet searches, according to aspects of the present disclosure.

FIG. 4 provides an example method 400 for coordinating presentation of a promotional event with Internet searches. The method 400 describes operations performed in connection with the promotional system 100 described herein and in particular FIGS. 1-2.

The method 400 starts at 402 with receiving a first signal that indicates automatic detection of presentation of a commercial. For example, the first signal may be received at the one or more processors from a sensing device (e.g., the sensing device 102) that one or more of optically or audibly detects auxiliary data that is encoded in the commercial. In another example, the first signal is received from a sensing device through which a broadcast signal containing the commercial is communicated to a television for presenting the broadcast signal and the commercial.

At 404, one or more online advertising settings associated with at least one of a product, service, or entity of interest in the commercial is determined. At 406, a current setting for the one or more online advertising settings is determined. In one example, the one or more online advertising settings are associated with a website of interest of the at least one of the product, service, or entity of interest.

At 408, a location at which the detection of the presentation of the commercial occurred is determined. At 410, a second signal is transmitted to the search engine system that temporarily changes the one or more online advertising settings during a time period following detection of the presentation of the commercial. In one specific example, the second signal may be sent to the search engine system to temporarily change the one or more online advertising settings for Internet searches occurring within a limited geographic area that includes the location that is determined.

Optionally, the one or more online advertising settings may include one or more of a bid for one or more search engine keywords, a location where an online advertisement is presented, a type of online advertisement, or a content of the online advertisement.

Optionally, the one or more online advertising settings may include a current bid for one or more search engine keywords associated with a website of interest of the at least one of the product, service, or entity of interest.

Optionally, the search engine system provides search results to Internet searches by user computers based on search terms that are input by the user computers and based on quality metrics of the search terms. The current setting represents a current bid amount paid to the search engine system when the user computers select a listed website associated with the one or more search engine keywords from the search results that include the listed website. Changing the one or more advertising settings for the one or more search engine keywords includes increasing the bid amount to increase the quality metric of the one or more search engine keywords associated with the website of interest of the at least one product, service, or entity of interest.

Optionally, the quality metric of the one or more search engine keywords is based on a combination of a click through rate and the bid of the one or more search engine keywords.

Optionally, increasing the quality metric of the one or more search engine keywords also moves a location of the website of interest of the at least one product, service, or entity of interest closer to a top of a list of website search results provided by the search engine system.

At 412, a third signal may be transmitted to the search engine system that reverts the one or more advertising settings to the current setting following expiration of the time period.

Figure 5:
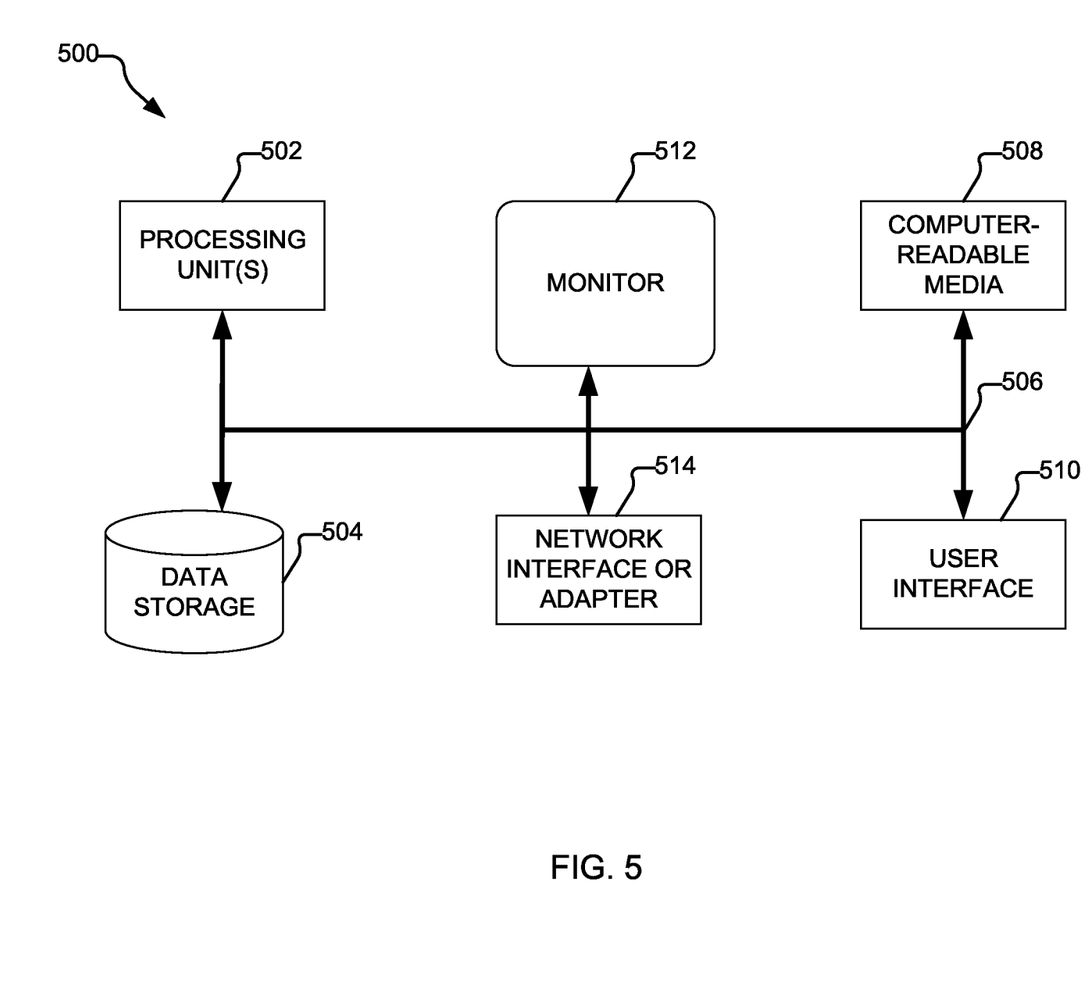
FIG. 5 illustrates an example computing device, according to aspects of the present disclosure.

FIG. 5 illustrates an example of a suitable computing and networking environment 500 that may be used to implement various aspects of the present disclosure described in FIGS. 1-3, such as the promotional system 100. As illustrated, the computing and networking environment 500 includes a general purpose computing device 500, although it is contemplated that the networking environment 500 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 500 may include various hardware components, such as a processing unit 502, a data storage 504 (e.g., a system memory), and a system bus 506 that couples various system components of the computer 500 to the processing unit 502. The system bus 506 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 may further include a variety of computer-readable media 508 that includes removable/non-removable media and volatile/nonvolatile media, but excludes transitory propagated signals. Computer-readable media 508 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 504 includes computer storage media in the form of volatile/nonvolatile memory such as read only memory (ROM) and random access memory (RAM). A basic input/output system (BIOS), containing the basic routines that help to transfer information between elements within the computer 500 (e.g., during start-up) is typically stored in ROM. RAM typically contains data and/or program modules that are immediately accessible to and/or presently being operated on by processing unit 502. For example, in one embodiment, data storage 504 holds an operating system, application programs, and other program modules and program data.

Data storage 504 may also include other removable/non-removable, volatile/nonvolatile computer storage media. For example, data storage 504 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 510 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 502 through a user interface 510 that is coupled to the system bus 506, but may be connected by other interface and bus structures, such as a parallel port, game port or a universal serial bus (USB). A monitor 512 or other type of display device is also connected to the system bus 506 via an interface, such as a video interface. The monitor 512 may also be integrated with a touch-screen panel or the like.

The computer 500 may operate in a networked or cloud-computing environment using logical connections of a network interface or adapter 514 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public and/or private network through the network interface or adapter 514. In such embodiments, a modem or other means for establishing communications over the network is connected to the system bus 506 via the network interface or adapter 514 or other appropriate mechanism. A wireless networking component including an interface and antenna may be coupled through a suitable device such as an access point or peer computer to a network. In a networked environment, program modules depicted relative to the computer 500, or portions thereof, may be stored in the remote memory storage device.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
receiving, at a first computing device, a first signal that indicates automatic detection of a presentation of a commercial at a second computing device, the automatic detection caused based on detection of a unique identifier embedded in a broadcast signal providing the commercial presented at the second computing device, the unique identifier indicating a start time of the commercial, wherein the first signal is received at the first computing device from a sensing device that one or more of optically or audibly detects the unique identifier;
in response to the detection of the presentation of the commercial, determining, using the first computing device, one or more online advertising settings associated with at least one of a product, service, or entity identified in the commercial;
determining, using the first computing device, a current setting for the one or more online advertising settings, the one or more online advertising settings associated with a website accessible by a user, the website associated with the at least one of the product, service, or entity of interest; and
transmitting, from the first computing device, a second signal to a third computing device that changes the one or more online advertising settings during a time period following detection of the presentation of the commercial, wherein changing the one or more advertising settings includes increasing a bid amount for one or more search engine keywords associated with a website of interest of the at least one product, service, or entity of interest to increase the quality metric of the one or more search engine keywords, and
wherein the time period is determined based on a watermark included in the broadcast signal.

2. The method of claim 1, wherein the one or more online advertising settings include one or more of a bid for one or more search engine keywords, a location where an online advertisement is presented, a type of online advertisement, or a content of the online advertisement.

3. The method of claim 1, wherein the one or more online advertising settings include a current bid for one or more search engine keywords associated with the website associated with the at least one of the product, service, or entity of interest.

4. The method of claim 3, wherein the third computing device provides search results to Internet searches by user computers based on search terms that are input by the user computers and based on quality metrics of the search terms, and wherein the current setting represents a current bid amount paid to the third computing device when the user computers select a listed website associated with the one or more search engine keywords from the search results that include the listed website.

5. The method of claim 4, wherein the quality metric of the one or more search engine keywords is based on a combination of a click through rate and the bid of the one or more search engine keywords.

6. The method of claim 4, wherein increasing the quality metric of the one or more search engine keywords also moves a location of the website of interest of the at least one product, service, or entity of interest closer to a top of a list of website search results provided by the third computing device.

7. The method of claim 1, further comprising:
following expiration of the time period, sending a third signal to the third computing device that reverts the one or more advertising settings to the current setting.

8. The method of claim 1, further comprising determining a location at which the detection of the presentation of the commercial occurred, wherein the second signal sent to the third computing device temporarily changes the one or more online advertising settings for Internet searches occurring within a limited geographic area that includes the location that is determined.

9. A system comprising:
one or more computing devices to:
receive, at a first computing device, a first signal that indicates automatic detection of a presentation of a commercial at a second computing device, the automatic detection caused based on the detection of a unique identifier embedded in a broadcast signal providing the commercial for the presentation at the second computing device, the unique identifier indicating a start time of the commercial, wherein the first signal is received at the first computing device from a sensing device that one or more of optically or audibly detects the unique identifier;
in response to the detection of the presentation of the commercial, determining, using the first computing device, one or more online advertising settings associated with at least one of a product, service, or entity identified in the commercial that was detected;
determine a current setting for the one or more online advertising settings from a third computing device, the one or more online advertising settings associated with a website associated with the at least one of the product, service, or entity of interest; and
transmit a second signal to the third computing device that changes the one or more online advertising settings during a time period following detection of the presentation of the commercial, wherein changing the one or more online advertising settings includes increasing a bid amount for one or more search engine keywords associated with the website of interest of the at least one product, service, or entity of interest to increase the quality metric of the one or more search engine keywords, and
wherein the time period is determined based on a watermark included in the broadcast signal.

10. The system of claim 9, wherein the one or more online advertising settings include one or more of a bid for one or more search engine keywords, a location where an online advertisement is presented, a type of online advertisement, or a content of the online advertisement.

11. The system of claim 9, wherein the one or more online advertising settings include a current bid for one or more search engine keywords associated with the website associated with the at least one of the product, service, or entity of interest.

12. The system of claim 11, wherein the third computing device provides search results to Internet searches by user computers based on search terms that are input by the user computers and based on quality metrics of the search terms,
wherein the current setting represents a current bid amount paid to the third computing device when the user computers select a listed website associated with the one or more search engine keywords from the search results that include the listed website.

13. The system of claim 12, wherein the quality metric of the one or more search engine keywords is based on a combination of a click through rate and the bid of the one or more search engine keywords.

14. The system of claim 12, wherein increasing the quality metric of the one or more search engine keywords also moves a location of the website of interest of the at least one product, service, or entity of interest closer to a top of a list of website search results provided by the third computing device.

15. The system of claim 9, further comprising, following expiration of the time period, sending a third signal to the third computing device that reverts the one or more advertising settings to the current setting.

16. The system of claim 9, further comprising determining a location at which the detection of the presentation of the commercial occurred, wherein the second signal sent to the third computing device temporarily changes the one or more online advertising settings for Internet searches occurring within a limited geographic area that includes the location that is determined.

17. A non-transitory computer readable medium encoded with instructions executable by one or more computing devices, the instructions comprising:
receiving, at a first computing device, a first signal that indicates automatic detection of a presentation of a commercial at a second computing device, the automatic detection caused based on the detection of a unique identifier embedded in a broadcast signal providing the commercial for the presentation at the second computing device, the unique identifier indicating a start time of the commercial, wherein the first signal is received at the first computing device from a sensing device that one or more of optically or audibly detects the unique identifier;
in response to the detection of the presentation of the commercial, determining one or more online advertising settings associated with at least one of a product, service, or entity identified in the commercial that was detected;
determining a current setting for the one or more online advertising settings from a third computing device, the one or more online advertising settings associated with a website associated with the at least one of the product, service, or entity of interest; and
transmitting a second signal to the third computing device that changes the one or more online advertising settings during a time period following detection of the presentation of the commercial, wherein changing the one or more online advertising settings includes increasing a bid amount for one or more search engine keywords associated with the website of interest of the at least one product, service, or entity of interest to increase the quality metric of the one or more search engine keywords, and wherein the time period is determined based on a watermark included in the broadcast signal.

\* \* \* \* \*